(12) United States Patent
Mourad et al.

(10) Patent No.: US 12,733,042 B2
(45) Date of Patent: Sep. 8, 2026

(54) VEHICLE WITH TWO COMMUNICATION DEVICES

(71) Applicant: Bayerische Motoren Werke Aktiengesellschaft, Munich (DE)

(72) Inventors: Alaa Mourad, Munich (DE); Walter Bronzi, Mountain View, CA (US); Guilherme Pereira, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 388 days.

(21) Appl. No.: 18/041,680

(22) PCT Filed: Apr. 23, 2021

(86) PCT No.: PCT/EP2021/060652
§ 371 (c)(1),
(2) Date: Feb. 14, 2023

(87) PCT Pub. No.: WO2022/053185
PCT Pub. Date: Mar. 17, 2022

(65) Prior Publication Data

US 2023/0319907 A1 Oct. 5, 2023

(30) Foreign Application Priority Data

Sep. 14, 2020 (EP) .................................... 20195925

(51) Int. Cl.
*H04W 76/10* (2018.01)
*H04W 12/50* (2021.01)

(52) U.S. Cl.
CPC ........... *H04W 76/10* (2018.02); *H04W 12/50* (2021.01)

(58) Field of Classification Search
CPC .............................. H04W 76/10; H04W 12/50
(Continued)

(56) References Cited

U.S. PATENT DOCUMENTS 8,736,438 B1 5/2014 Vasquez et al.
9,521,238 B1 * 12/2016 Thanayankizil .. H04M 1/72412
(Continued)

FOREIGN PATENT DOCUMENTS

CN 102170299 B 1/2014
CN 103782570 A 5/2014
(Continued)

OTHER PUBLICATIONS

International Search Report corresponding to International Patent Application No. PCT/EP2021/060652, dated Jul. 9, 2021 (4 pages).
(Continued)

*Primary Examiner* — Christopher B Robinson
*Assistant Examiner* — Chong G Kim
(74) *Attorney, Agent, or Firm* — Maginot, Moore & Beck LLP

(57) ABSTRACT

A pairing procedure pairs a mobile device with a device with two communication devices. A device includes a first wireless communication device, a separate second wireless communication device, and control circuitry configured to perform a first pairing procedure between the first wireless communication device and a mobile device to establish a communication channel between the first wireless communication device and the mobile device. The control circuitry further performs a second pairing procedure between the second wireless communication device and the mobile device by exchanging pairing information for pairing the second wireless communication device and the mobile device with the mobile device via the communication channel between the first wireless communication device and the mobile device.

20 Claims, 3 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,427,644 | B2 * | 10/2019 | Weghaus | B60R 25/24 |
| 2009/0111378 | A1 | 4/2009 | Sheynman et al. | |
| 2011/0210830 | A1 | 9/2011 | Talty | |
| 2014/0179276 | A1 * | 6/2014 | Kang | H04W 12/06 455/39 |
| 2014/0227979 | A1 | 8/2014 | Maihoefer | |
| 2015/0098706 | A1 | 4/2015 | Narendra et al. | |
| 2016/0072855 | A1 | 3/2016 | Palin | |
| 2016/0318475 | A1 | 11/2016 | Honkanen | |
| 2018/0215347 | A1 | 8/2018 | Weghaus et al. | |
| 2018/0352583 | A1 | 12/2018 | Smith | |
| 2021/0076208 | A1 * | 3/2021 | Hassani | H04W 4/40 |
| 2021/0127262 | A1 * | 4/2021 | Park | H04W 12/50 |
| 2021/0345081 | A1 * | 11/2021 | Li | H04W 4/80 |
| 2022/0039179 | A1 * | 2/2022 | Chen | H04R 1/1016 |
| 2023/0192034 | A1 * | 6/2023 | Yang | H04W 4/80 340/5.72 |

FOREIGN PATENT DOCUMENTS

| | | | |
|---|---|---|---|
| CN | 106358141 | A | 1/2017 |
| CN | 107351786 | A | 11/2017 |
| CN | 108235297 | A | 6/2018 |
| CN | 108290546 | A | 7/2018 |
| CN | 108990030 | A | 12/2018 |
| CN | 109600347 | A | 4/2019 |
| JP | 5676507 | B2 | 2/2015 |

OTHER PUBLICATIONS

Written Opinion corresponding to International Patent Application No. PCT/EP2021/060652, dated Jul. 9, 2021 (5 pages).
Extended European Search Report corresponding to European Patent Application No. EP20195925, dated Mar. 1, 2021 (7 pages).
English Translation of CN109600347A. (27 Pages).
Chinese Office Action corresponding to Chinese Patent Application No. 202180057148.7, dated Mar. 22, 2025. (8 pages).
English Translation of Chinese Office Action corresponding to Chinese Patent Application No. 202180057148.7, dated Mar. 22, 2025. (9 pages).

* cited by examiner

VEHICLE WITH TWO COMMUNICATION DEVICES

The present application is the U.S. national phase of PCT Application PCT/EP2021/060652 filed on Apr. 23, 2021, which claims priority of European patent application No. 20195925.1 filed on Sep. 14, 2020, which is incorporated herein by reference in its entirety.

FIELD

The present disclosure relates generally to wireless communication devices, and in particular to a pairing procedure for pairing a mobile device with a device with two communication devices.

BACKGROUND

Many devices, such as vehicles, comprise wireless communication capabilities, which may be used for wireless communication with another device. To setup this wireless communication, in some wireless technologies, a so-called pairing procedure is performed, which may be used to setup an encrypted and secure channel between the two wireless communication devices. One such wireless technology is the Bluetooth® wireless technology, which uses a pairing procedure that sometimes includes the comparison of a pin code that is being output by both devices. Such a pairing procedure, however, is often inconvenient, as it takes effort to complete. European patent EP 2 807 875 B1 discloses a mobile communications system providing enhanced Out of Band (OOB) Bluetooth pairing and related methods. In said patent, the Bluetooth pairing procedure is performed via an Out-of-Band channel, e.g. via USB, via Near Field Communication or via a Wireless Local Area Network. In U.S. Pat. No. 9,000,914 B2, sensors for collecting medial sensor data that are equipped with Bluetooth are paired using an Out-of-Band pairing process, by placing the Bluetooth sensors on the same body.

SUMMARY

There may be a desire for an improved concept for performing a pairing process between wireless devices.

This desire is addressed by the subject-matter of the independent claims. Various examples of the present disclosure are based on the finding that some devices include two or more separate wireless communication devices that are to be paired with the same mobile device. For example, a vehicle may comprise a first wireless communication device (e.g. an Ultra-Wideband communication device or a Bluetooth communication device) that is used to provide a keyless access functionality of the vehicle, and a second wireless communication device (e.g. a Bluetooth communication device) that is used for the multimedia, hands-free and video projection functionality of the vehicle. Due to security reasons, the two wireless communication devices may be separate from each other. To decrease the effort required for pairing both wireless communication devices to the (same) mobile device, a first pairing procedure is performed to establish a first communication channel, and this communication channel is subsequently used to perform an out-of-band pairing procedure between the second wireless communication device and the mobile device via the first wireless communication device, thereby decreasing the effort required for the second pairing procedure. Various examples of the present disclosure provide a device comprising a first Bluetooth communication device, a separate second Bluetooth communication device and control circuitry. The control circuitry is configured to perform a first Bluetooth pairing procedure between the first Bluetooth communication device and a mobile device to establish a communication channel between the first Bluetooth communication device and the mobile device. The control circuitry is configured to perform a second Bluetooth pairing procedure between the second Bluetooth communication device and the mobile device by exchanging pairing information for pairing the second Bluetooth communication device and the mobile device with the mobile device via the communication channel between the first Bluetooth communication device and the mobile device. By using the communication channel that is established between the first Bluetooth communication device and the mobile device for the second pairing procedure, a user input by a user of the mobile device may be made redundant, without reducing the security of the second pairing procedure.

In general, the pairing information is exchanged between the second Bluetooth communication device and the mobile device via the first Bluetooth communication device. Accordingly, the first and second Bluetooth communication device may be (at least indirectly) coupled, so the pairing information is exchanged between the first and second Bluetooth communication device. In various examples, the control circuitry is configured to transmit information on one or more capabilities of the second Bluetooth communication device to the mobile device via the communication channel. This can be used by the mobile device to request access to the one or more capabilities.

In general, the second pairing procedure (and likewise the first) may comprise exchanging messages between the mobile device and the second Bluetooth communication device. For example, the control circuitry may be configured to obtain a request for pairing the mobile device with the second Bluetooth communication device from the mobile device via the communication channel, to provide the request to the second Bluetooth communication device, and to provide a response to the request from the second Bluetooth communication device to the mobile device via the communication channel. In other words, the request and the corresponding response may be forwarded by the control circuitry.

For example, the request may comprise one or more capabilities of the mobile device. Additionally or alternatively, the request may indicate, whether the mobile device requests to use a vehicular display for displaying information provided by the mobile device. This information may be used by the second Bluetooth communication device to setup a further communication channel between the second Bluetooth communication device and the mobile device.

In various examples, the response comprises information on a cryptographic secret provided by the second Bluetooth communication device. This cryptographic information may be used to encrypt the further communication channel, e.g. by performing a Diffie-Hellman key exchange. In general, the pairing information may comprise out-of-band pairing communication according to the Bluetooth standard. This pairing information may be used to perform the second pairing procedure without requiring an interaction with a user of the mobile device.

For example, the second Bluetooth pairing procedure may be initiated without requiring a confirmation of a code sequence by a user of the mobile device or the device. The second Bluetooth pairing procedure may be initiated automatically. This may reduce the effort required for performing the second Bluetooth pairing procedure.

In some examples, the device is a vehicle. The first Bluetooth communication device may be configured to perform communication for a keyless access or keyless go functionality of the vehicle. Additionally or alternatively, the second Bluetooth communication device may be configured to perform communication for a hands-free functionality, a media playback functionality or a video projection functionality of the vehicle. In other words, the pairing performed for the keyless access/go functionality may be used to facilitate the pairing for the head unit of the vehicle.

Various examples of the present disclosure further provide a corresponding method for pairing a mobile device with a first and a second Bluetooth communication device. The method comprises performing a first Bluetooth pairing procedure between the first Bluetooth communication device and a mobile device to establish a communication channel between the first Bluetooth communication device and the mobile device. The method comprises performing a second Bluetooth pairing procedure between the second Bluetooth communication device and the mobile device by exchanging pairing information for pairing the second Bluetooth communication device and the mobile device with the mobile device via the communication channel between the first Bluetooth communication device and the mobile device.

Various examples of the present disclosure further provide a corresponding computer program having a program code for performing the above method, when the computer program is executed on a computer, a processor, or a programmable hardware component.

Various examples of the present disclosure further provide a vehicle comprising a first wireless communication device configured to perform communication for a keyless access or keyless go functionality of the vehicle. The vehicle comprises a separate second wireless communication device configured to perform communication for a hands-free functionality, a media playback functionality, or a video projection functionality of the vehicle. The vehicle comprises control circuitry configured to perform a first pairing procedure between the first wireless communication device and a mobile device to establish a communication channel between the first wireless communication device and the mobile device. The control circuitry is configured to perform a second pairing procedure between the second wireless communication device and the mobile device by exchanging pairing information for pairing the second wireless communication device and the mobile device with the mobile device via the communication channel between the first wireless communication device and the mobile device. By using the communication channel that is established between the first wireless communication device and the mobile device for the second pairing procedure, the pairing performed for the keyless access/go functionality may be used to facilitate the pairing for the head unit of the vehicle. In general, the pairing information is exchanged between the second wireless communication device and the mobile device via the first wireless communication device. Accordingly, the first and second wireless communication device may be (at least indirectly) coupled, so the pairing information is exchanged between the first and second wireless communication device. In some examples, the second pairing procedure is initiated without requiring a confirmation of a code sequence by a user of the mobile device or the vehicle. For example, the second pairing procedure may be initiated automatically by providing a prompt to the user of the mobile device or the vehicle. This may reduce the effort required for performing the second pairing procedure.

In some examples, the first wireless communication device is a first Bluetooth communication device, or a combined Bluetooth/UWB communication device. In other words, the first wireless communication device may be a first Bluetooth communication device and/or a first Ultra-Wideband communication device. Bluetooth or UWB may be used to provide the keyless access/go functionality in the vehicle.

Additionally or alternatively, the second wireless communication may be a second Bluetooth communication device or a communication device for communicating in a Wireless Local Area Network. Bluetooth or WLAN may be used to connect the mobile device to a head unit of the vehicle. Accordingly, the second pairing procedure may be a Bluetooth pairing procedure or wherein the second pairing procedure is a procedure for joining a Wireless Local Area Network. In various examples, the control circuitry is configured to transmit information on one or more capabilities of the second Bluetooth communication device to the mobile device via the communication channel. This can be used by the mobile device to request access to the one or more capabilities.

In general, the second pairing procedure (and likewise the first) may comprise exchanging messages between the mobile device and the second Bluetooth communication device. For example, the control circuitry may be configured to obtain a request for pairing the mobile device with the second Bluetooth communication device from the mobile device via the communication channel, to provide the request to the second Bluetooth communication device, and to provide a response to the request from the second Bluetooth communication device to the mobile device via the communication channel. In other words, the request and the corresponding response may be forwarded by the control circuitry.

For example, the request may comprise one or more capabilities of the mobile device. Additionally or alternatively, the request may indicate, whether the mobile device requests to use a vehicular display for displaying information provided by the mobile device. This information may be used by the second Bluetooth communication device to setup a further communication channel between the second Bluetooth communication device and the mobile device.

In various examples, the response comprises information on a cryptographic secret provided by the second Bluetooth communication device. This cryptographic information may be used to encrypt the further communication channel, e.g. by performing a Diffie-Hellman key exchange. Various examples of the present disclosure further provide a corresponding method for pairing a mobile device with a first and a second wireless communication device of a vehicle. The first wireless communication device is configured to perform communication for a keyless access or keyless go functionality of the vehicle. The second wireless communication device is configured to perform communication for a hands-free functionality, a media playback functionality or a video projection functionality of the vehicle. The method comprises performing a first pairing procedure between the first wireless communication device and a mobile device to establish a communication channel between the first wireless communication device and the mobile device. The method comprises performing a second pairing procedure between the second wireless communication device and the mobile device by exchanging pairing information for pairing the second wireless communication device and the mobile device with the mobile device via the communication channel between the first wireless communication device and the mobile device.

Various examples of the present disclosure further provide a corresponding computer program having a program code for performing the above method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
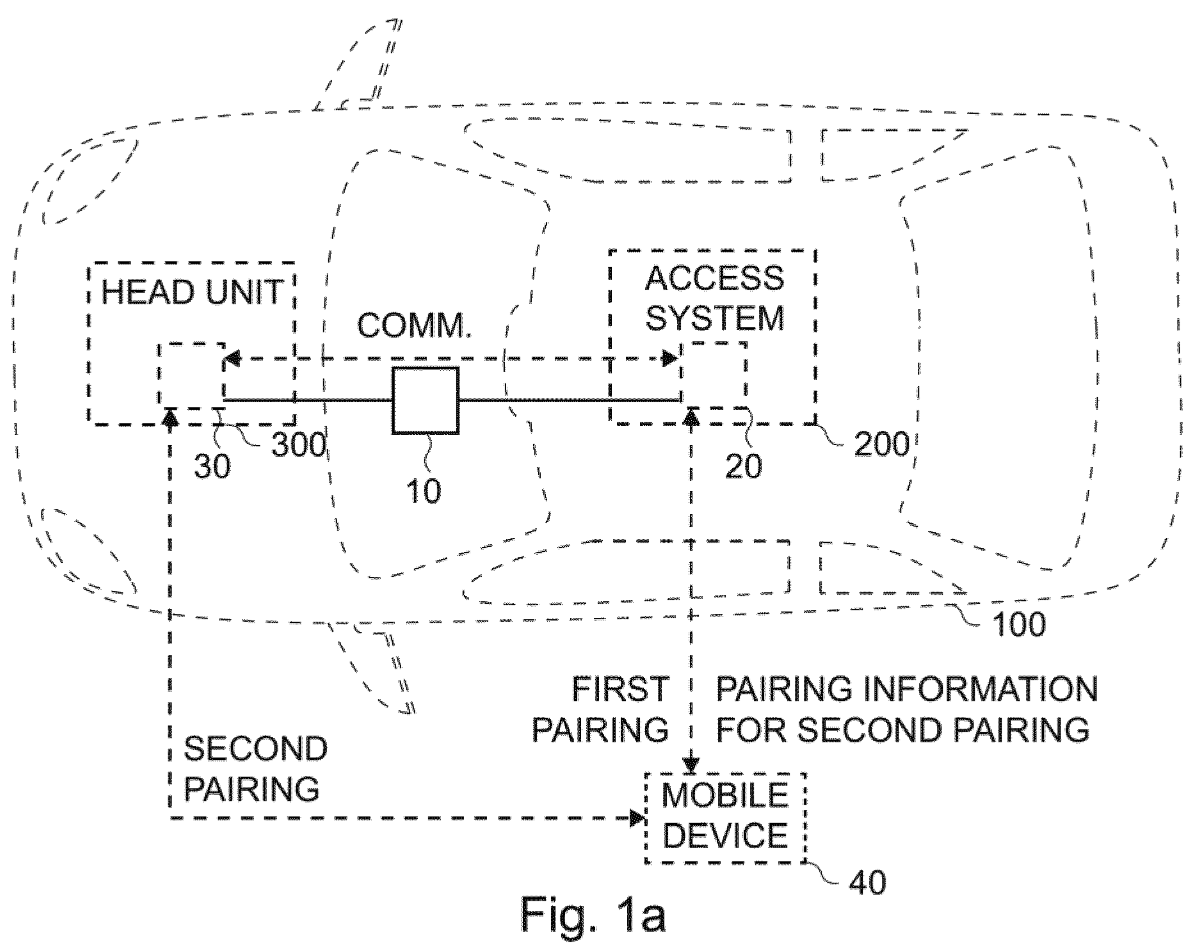
FIG. 1*a* shows a block diagram of an example of a device or vehicle comprising a first and a second wireless communication device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples. Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to a Head unit Bluetooth Out-of-band Pairing in a Vehicle.

Bluetooth low energy (BLE) is a technology that has many applications in the automotive sector. An important feature for use in vehicles is the application of BLE in keyless access/go systems that use smartphones. BLE may be used for discovery and a communication channel with the smartphone, whereas other systems like UWB can be used for the localization of the smartphone. The BLE chip for car access systems may be directly connected to the main vehicle ECU (Electronic Control Unit) due to high security requirements. Therefore the Bluetooth chip in the head unit might not be used for such applications. However this secured communication channel between the smartphone and main ECU can be used to simplify the Bluetooth pairing of the Smartphone with the head unit. In some systems, the Bluetooth pairing of the smartphone with the head unit is usually done using a pin comparison mechanism, which is not attractive for the users, as multiple steps must be taken to complete the pairing. Various examples of the present disclosure may overcome this by simplifying the pairing process of the smartphone with the head unit. This makes the head unit pairing faster and more accessible for the customers.

To simplify the second pairing procedure between the head unit and the smartphone, the Secured channel between the main ECU and the smartphone, which is used for the keyless car access system, can be used to transfer out-of-band (OOB) data needed for the pairing of head unit. This makes the pairing process of the head unit with the phone more secure and faster. In other words, at the end of the pairing process for a new smart device with the main ECU for the car access system, OOB data may be exchanged between the Bluetooth chip in the head unit and the smartphone.

Various examples of the present disclosure may be implemented in vehicles, smartphones, or by other technology providers.

FIG. 1*a* shows a block diagram of an example of a device or vehicle 100 comprising a first wireless communication device 20 and a second wireless communication device 30. The device/vehicle 100 comprises control circuitry configured to perform a first (wireless) pairing procedure between the first wireless communication device and a mobile device to establish a communication channel between the first wireless communication device and the mobile device. The control circuitry is configured to perform a second pairing procedure between the second wireless communication device and the mobile device by exchanging pairing information for pairing the second wireless communication device and the mobile device with the mobile device via the communication channel between the first wireless communication device and the mobile device.

Figure 1B:
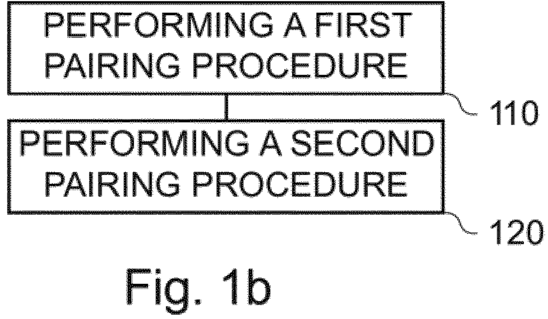
FIG. 1*b* shows a flow chart of an example of a method for pairing a mobile device with a first and a second wireless communication device.

FIG. 1*b* shows a flow chart of an example of a corresponding method for pairing a mobile device with a first and a second wireless/Bluetooth communication device. The method comprises performing 110 first pairing procedure between the first wireless communication device and a mobile device to establish a communication channel between the first wireless communication device and the mobile device. The method comprises performing a second pairing procedure 120 between the second wireless communication device and the mobile device by exchanging pairing information for pairing the second wireless communication device and the mobile device with the mobile device via the communication channel between the first wireless communication device and the mobile device.

Various aspects of the present disclosure relate to a device, method and computer program for pairing two wireless communication devices of the device to a mobile device, in an efficient manner. Such as scenario is present, for example, in a vehicle with an access system 200 that comprises the first wireless communication device (e.g. a first Bluetooth communication device) 20, and which is used to perform the communication for providing a for a keyless access or keyless go functionality of the vehicle, and a head unit 300 that comprises the second wireless communication device (e.g. a second Bluetooth communication device 30), and that is used to perform the communication for a hands-free functionality, a media playback functionality, or a video projection functionality of the vehicle. In other words, the first wireless communication device 20 may be configured to perform communication for a keyless access or keyless go functionality of the vehicle. The second wireless communication device 30 may be separate from the first wireless communication device. It may be configured to perform communication for a hands-free functionality, a media playback functionality, or a video projection functionality of the vehicle. In general, the access system is provided by the main ECU of the vehicle (that coordinates the driving- and security-related features of the vehicle), and the head unit is the system that provides the user-facing functionality, such as the hands-free functionality, the media playback functionality, or the video projection functionality, but also provides an interface for changing settings of the vehicle. In this context, the video projection functionality relates to a displaying of a user interface of the mobile device via a display of the vehicle (e.g. using Apple CarPlay or Android Auto).

In vehicles, the first and second wireless communication devices are usually first and second Bluetooth communication devices. Accordingly, the first and second pairing procedures may be first and second Bluetooth pairing procedures. In this context, "Bluetooth" may refer to any communication protocol defined by a version of the Bluetooth standard, including Bluetooth Low Energy. Alternatively or additionally, other wireless technologies may be employed. For example, the first wireless communication device may be a first Ultra-Wideband communication device, or a first combined Bluetooth and UWB communication device. The second wireless communication device may be a second Bluetooth communication device and/or a communication device for communicating in a Wireless Local Area Network (e.g. a combined Bluetooth/WLAN communication device). Accordingly, the first pairing procedure may be a first UWB or Bluetooth pairing procedure, and/or the second pairing procedure may be a (second) Bluetooth pairing procedure or a procedure for joining a Wireless Local Area Network.

A basic idea of the present disclosure is to use the (secure, encrypted) communication channel that is established by the first pairing procedure to transmit the pairing information.

Accordingly, the first pairing procedure is performed, and completed, before the exchange of the pairing information for the second pairing procedure is performed. The control circuitry configured to perform the first (wireless) pairing procedure between the first wireless communication device and the mobile device to establish the communication channel between the first wireless communication device and the mobile device. As has been mentioned above, the first pairing procedure may be a first Bluetooth pairing procedure, or a first UWB pairing procedure. The first pairing procedure may establish the (secure, encrypted) communication channel. Accordingly, the first pairing procedure may comprise the exchange of cryptographic information, e.g. based on a Diffie-Hellman key exchange.

Once the communication channel is established, it can be used to perform the second pairing procedure. The control circuitry is configured to perform the second pairing procedure between the second wireless communication device and the mobile device by exchanging the pairing information for pairing the second wireless communication device and the mobile device with the mobile device via the communication channel between the first wireless communication device and the mobile device. In other words, the pairing information is exchanged, between the second wireless communication device and the mobile device, via the first wireless communication device. Accordingly, the first and second wireless communication modules may be coupled, at least via the control circuitry. For example, the pairing information may be exchanged via an internal communication channel between the first wireless communication device and the second wireless communication device (and the communication channel between the first wireless communication device and the mobile device).

The exchange of the pairing information over the (established) communication channel enables the automation of the second pairing procedure. For example, the pairing information may be initiated automatically, with the user merely being prompted whether the second pairing procedure is to be performed. In other words, the second pairing procedure may be initiated automatically, e.g. by providing a prompt to the user of the mobile device or the vehicle, and/or without requiring the user to initiate the pairing procedure from the mobile device. In particular, the second pairing procedure may be initiated without requiring a confirmation of a code sequence by a user of the mobile device or the vehicle.

While the principle of the proposed concept is also applicable to other wireless technologies, such as WLAN, the following description assumes, in part, that the second pairing procedure is a second Bluetooth pairing procedure. However, the same information can also be exchanged in a pairing procedure to be performed for a different wireless technology. The Bluetooth standard already comprises a section that relates to Out-of-Band pairing, that can be employed by the technologies presented in the present disclosure. Accordingly, the pairing information may comprise out-of-band pairing communication according to the Bluetooth standard. An illustration of the second pairing procedure that is based atop the Bluetooth OOB-Pairing procedure is shown in FIG. 2.

Figures 1, 2:
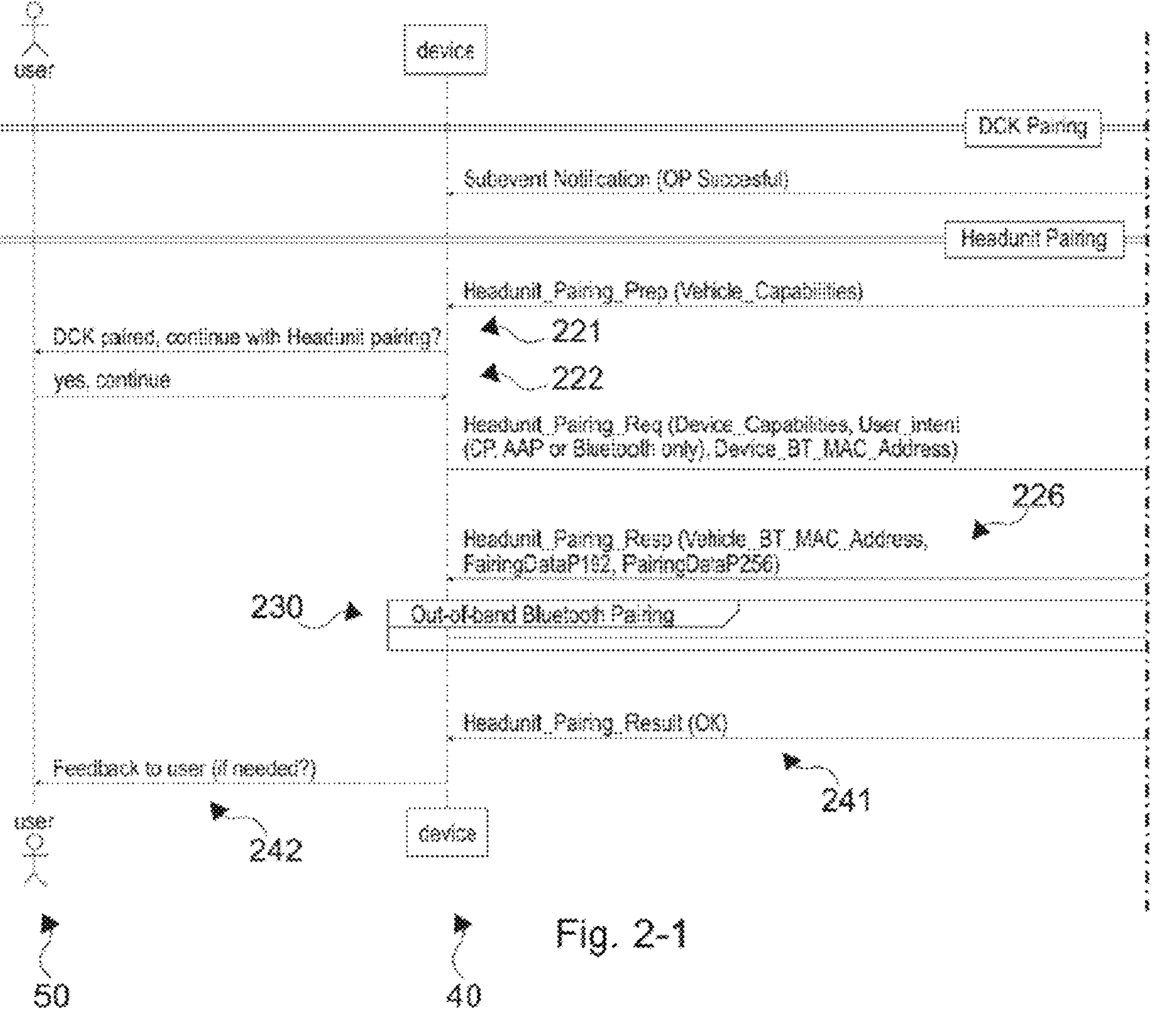
FIG. 2 shows a diagram of a message exchange between a mobile device, a wireless communication device for providing a digital car key functionality, and a wireless communication device of a head unit.
Figure 2:
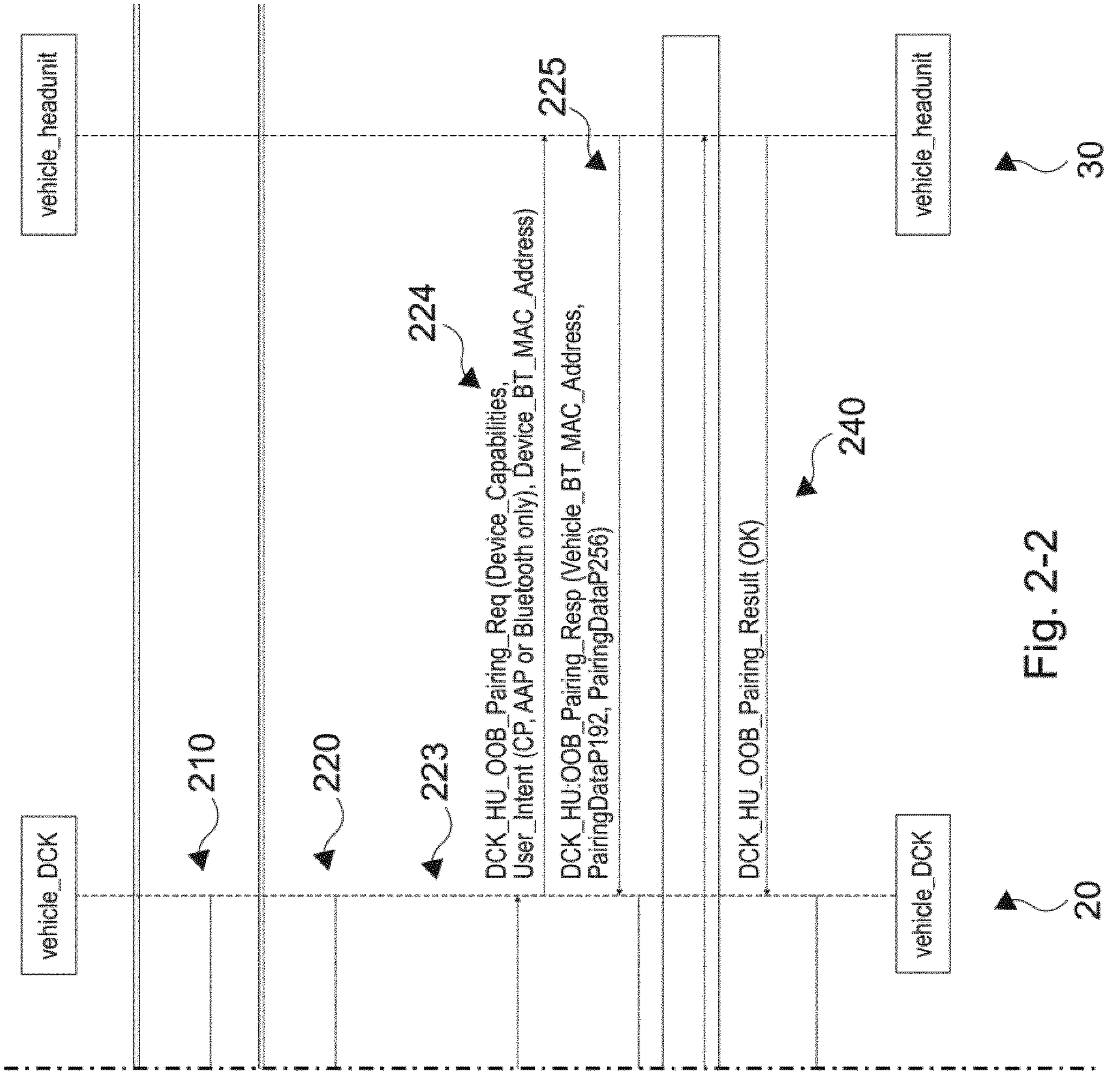

FIG. 2 shows a diagram of a message exchange between a mobile device, a wireless communication device for providing a digital car key functionality, and a wireless communication device of a head unit. For example, FIG. 2 may show a combined pairing of a digital car key (i.e. the access system 200) and a head unit (300). FIG. 2 shows different entities: A user 50 of a (mobile) device 40, the device 40, the vehicle_DCK 20 (i.e. the first wireless communication device 20 of the access system 200) and the vehicle_headunit (i.e. the second wireless communication device 30 of the head unit 300). First, the pairing of the DCK (Digital Car Key) is performed, resulting in a "Subevent Notification" (that the operation is successful) 210 from the vehicle_DCK 20 to the device 40. Then the pairing of the head unit follows, starting with a "Headunit_Pairing_Prep" message 220 from the vehicle_DCK 20 to the device 40. In other words, a message is transmitted in preparation of the pairing of the head unit, which includes the capabilities of the vehicle, in particular of the head unit of the vehicle. In other words, the control circuitry may be configured to transmit information on one or more capabilities of the second Bluetooth communication device to the mobile device via the communication channel (as part of the exchange of pairing information). The device 40 notifies 221 the user 50 that the DCK is paired (i.e. that the first pairing procedure is completed), and prompts the user whether to continue with the pairing with the head unit. The user responds with a "yes, continue" 222, and the device 40 provides a "Headunit_Pairing_Req(Device_Capabilities, User_Intent (CP, AAP or Bluetooth only), De-vice_BT_MAC_Address)" message 223 to the vehicle_DCK 20 (via the established communication channel). In other words, the device 40 provides a request for pairing with the head unit to the vehicle_DCK 20, stating the capabilities of the device 40, whether to use a vehicular display for displaying information provided by the mobile device (i.e. to use the video projection functionality), e.g. using CarPlay (CP) or Android Auto (AA), and the device identifier of the device 40. In other words, the control circuitry may be configured to obtain a request for pairing the mobile device with the second Bluetooth communication device from the mobile device via the communication channel. The request may comprise (information on) one or more capabilities of the mobile device. The request may further comprise information on whether the mobile device requests to use a vehicular display for displaying information provided by the mobile device (i.e. to use the video projection functionality). The vehicle_DCK transforms the request into the following message "DCK_HU_OOB_Pairing_Req(Device_Capabilities, User_Intent (CP, AAP or Bluetooth only), Device_BT_MAC_Address)" 224 (DCK to Head Unit Out of Band Pairing Request). In other words, the control circuitry may be configured to provide the request to the second Bluetooth communication device (as message 224), and to provide a response to the request from the second Bluetooth communication device to the mobile device via the communication channel (via messages 225 and 226 as shown in the following). The vehicle_headunit 30 may accordingly provide the response to the request to the device 40, via the vehicle_DCK 20, using messages 225 "DCK_HU_OOB_Pairing_Resp (Vehicle_BT_MAC_Address, PairingDataP192, PairingDataP256)" and "Headunit_Pairing_Resp(Vehicle_BT_MAC_Address, PairingDataP192, PairingDataP256), which includes the Media Access Control Address of the vehicle_headunit 30 and a cryptographic secret (PairingDataP192, PairingDataP256, cryptographic information for establishing 192 bit and 256 bit Elliptic Curve Diffie Hellman encryption) for establishing a cryptographic channel (according to the Bluetooth OOB pairing specification). Accordingly, the response may comprise information on a cryptographic secret provided by the second Bluetooth communication device, e.g. a cryptographic secret for establishing the further secure, encrypted communication channel directly between the second wireless communication device and the mobile device. Once this information is exchanged, Bluetooth Out of Band pairing 230 may be performed (to perform the second pairing procedure). To confirm the successful pairing, the vehicle_headunit 30 may transmit a confirmation message "DCK_HU_OOB_Pairing_Result (OK)" 240 to the device 40, via the vehicle_DCK 20, which may transform message 240 into "Headunit_Pairing_Result (OK)" 241 and transmit it to the device via the communication channel. The device 40 may provide feedback 242 to the user 50 (if needed).

As has been pointed out before, the same concept may also be used with other wireless technologies. For example, if the second wireless communication device is a wireless communication device for communication in a wireless local area network, the exchange of the pairing information may comprise information on a service set identifier (SSID) of a wireless network, and cryptographic information on a shared key used for communication in the wireless network.

The control circuitry may be a part of the first wireless communication device, or co-located with the first wireless communication device, e.g. within the access system/main ECU of the vehicle. Alternatively, the control circuitry may be a part of the second wireless communication device, or co-located with the second wireless communication device, e.g. within the head unit of the vehicle. Alternatively, the control circuitry may be separate from both the first wireless communication device (and the access system) and the second wireless communication device (and the head unit).

In various examples, the control circuitry 10 may be implemented using one or more processing units, one or more processing devices, any means for processing, such as a processor, a computer or a programmable hardware component being operable with accordingly adapted software. In other words, the described function of the control circuitry 10 may as well be implemented in software, which is then executed on one or more programmable hardware components. Such hardware components may comprise a general-purpose processor, a Digital Signal Processor (DSP), a micro-controller, etc.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system. The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A vehicle comprising:

a first Bluetooth communication device;

a second Bluetooth communication device; and control circuitry configured to:

perform a first Bluetooth pairing procedure between the first Bluetooth communication device and a mobile device to establish a communication channel between the first Bluetooth communication device and the mobile device, and perform a second Bluetooth pairing procedure between the second Bluetooth communication device and the mobile device by exchanging pairing information for pairing the second Bluetooth communication device with the mobile device via the communication channel between the first Bluetooth communication device and the mobile device, wherein the pairing information includes information sent from the second Bluetooth communication device to the mobile device via the first Bluetooth communication device and the communication channel between the first Bluetooth communication device and the mobile device.

2. The vehicle according to claim 1, wherein the control circuitry is configured to transmit information on one or more capabilities of the second Bluetooth communication device to the mobile device via the communication channel.

3. The vehicle according to claim 1, wherein the control circuitry is configured to obtain a request for pairing the mobile device with the second Bluetooth communication device from the mobile device via the communication channel, to provide the request to the second Bluetooth communication device via the first communication device, and to provide a response to the request from the second Bluetooth communication device to the mobile device via the communication channel.

4. The vehicle according to claim 3, wherein the request comprises one or more capabilities of the mobile device.

5. The vehicle according to claim 3, wherein the request indicates whether the mobile device requests to use a vehicular display for displaying information provided by the mobile device.

6. The vehicle according to claim 5, wherein the response comprises information on a cryptographic secret provided by the second Bluetooth communication device.

7. The vehicle according to claim 3, wherein the request indicates whether the mobile device requests to use a vehicular display for displaying information provided by the mobile device.

8. The vehicle according to claim 3, wherein the response comprises information on a cryptographic secret provided by the second Bluetooth communication device.

9. The vehicle according to claim 8, wherein the pairing information comprises out-of-band pairing communication according to an accepted Bluetooth standard.

10. The vehicle according to claim 1, wherein the pairing information comprises out-of-band pairing communication according to an accepted Bluetooth standard.

11. The vehicle according to claim 10, wherein the second Bluetooth pairing procedure is initiated without requiring a confirmation of a code sequence by a user of the mobile device or the device.

12. The vehicle according to claim 11, wherein the second Bluetooth pairing procedure is initiated automatically by providing a prompt to the user of the mobile device or the vehicle.

13. The vehicle according to claim 1, wherein the second Bluetooth pairing procedure is initiated without requiring a confirmation of a code sequence by a user of the mobile device or the device.

14. The vehicle according to claim 1, wherein the second Bluetooth pairing procedure is initiated automatically by providing a prompt to a user of the mobile device or the vehicle.

15. The vehicle according to claim 1, wherein the vehicle includes an engine control unit (ECU) directly connected to the first Bluetooth communication device, and wherein the first Bluetooth communication device is configured to perform communication for a keyless access or keyless go functionality of the vehicle.

16. The vehicle according to claim 15, wherein the second Bluetooth communication device is configured to perform communication for a hands-free functionality, a media playback functionality or a video projection functionality of the vehicle.

17. A method for pairing a mobile device with a first and a second Bluetooth communication device, the method comprising:

performing a first Bluetooth pairing procedure between the first Bluetooth communication device and a mobile device to establish a communication channel between the first Bluetooth communication device and the mobile device; and performing a second Bluetooth pairing procedure between the second Bluetooth communication device and the mobile device by exchanging pairing information for pairing the second Bluetooth communication device with the mobile device via the communication channel between the first Bluetooth communication device and the mobile device, wherein the pairing information includes information sent from the second Bluetooth communication device to the mobile device via the first Bluetooth communication device and the communication channel between the first Bluetooth communication device and the mobile device.

18. A computer program having a program code for performing the method of claim 17, when the computer program is executed on a computer, a processor, or a programmable hardware component.

19. The method according to claim 17, wherein the pairing information sent from the second Bluetooth communication device to the mobile device via the first Bluetooth communication device and the communication channel includes information on one or more capabilities of the second Bluetooth communication device.

20. The method according to claim 17, wherein the first Bluetooth communication device and the second Bluetooth communication device are both provided within a vehicle, wherein the first Bluetooth communication device is provided within a keyless access system or keyless go system of the vehicle, wherein the second Bluetooth communication device is provided within a head unit of the vehicle, and wherein performing the second Bluetooth pairing procedure includes:

(1) receiving, at the first Bluetooth communication device via the established communication channel between the first Bluetooth communication device and the mobile device, a request for pairing the mobile device with the second Bluetooth communication device;

(2) sending, from the first Bluetooth communication device to the second Bluetooth communication device, the request for pairing the mobile device with the second Bluetooth communication device;

(3) receiving, at the first Bluetooth communication device, a response to the request for pairing the mobile device to the second Bluetooth communication device;

(4) sending, via the established communication channel between the first Bluetooth communication device and the mobile device, the response to the request for pairing the mobile device to the second Bluetooth communication device; and (5) performing Bluetooth Out of Band pairing between the second Bluetooth communication device and the mobile device.

* * * * *